(12) United States Patent
Hosoya et al.

(10) Patent No.: US 9,498,742 B2
(45) Date of Patent: Nov. 22, 2016

(54) FILTRATION MATERIAL FOR FILTERS, AND FILTER CARTRIDGE

(75) Inventors: Takayoshi Hosoya, Okayama (JP);
Shinya Inada, Okayama (JP); Hideki Kamada, Okayama (JP); Hiroyuki Kawai, Osaka (JP)

(73) Assignee: KURARAY CO., LTD., Kurashiki-shi (JP)

( * ) Notice: Subject to any disclaimer, the term of this patent is extended or adjusted under 35 U.S.C. 154(b) by 1107 days.

(21) Appl. No.: 13/141,808

(22) PCT Filed: Dec. 17, 2009

(86) PCT No.: PCT/JP2009/071025
§ 371 (c)(1),
(2), (4) Date: Aug. 23, 2011

(87) PCT Pub. No.: WO2010/073958
PCT Pub. Date: Jul. 1, 2010

(65) Prior Publication Data
US 2011/0309014 A1    Dec. 22, 2011

(30) Foreign Application Priority Data

Dec. 25, 2008  (JP) ................................ 2008-329598
Aug. 19, 2009  (JP) ................................ 2009-190093

(51) Int. Cl.
*B01D 39/16*     (2006.01)
*B32B 5/26*      (2006.01)
(Continued)

(52) U.S. Cl.
CPC ............. *B01D 39/1623* (2013.01); *B32B 5/26* (2013.01); *B32B 27/02* (2013.01); *B32B 27/34* (2013.01); *B32B 27/36* (2013.01); *D01D 5/0007* (2013.01); *D04H 1/4374* (2013.01); *D04H 1/728* (2013.01); *D04H 3/009* (2013.01); *D04H 3/011* (2013.01);
(Continued)

(58) Field of Classification Search
None
See application file for complete search history.

(56) References Cited

U.S. PATENT DOCUMENTS 4,083,829 A * 4/1978 Calundann et al. .......... 528/176
5,336,556 A * 8/1994 Yoshida et al. .............. 442/414
2009/0047515 A1  2/2009 Kohinata et al.

FOREIGN PATENT DOCUMENTS

EP   1 757 406 A1   2/2007
EP   2 202 764 A1   6/2010
(Continued)

OTHER PUBLICATIONS

Beachley et al. (2009, Mater Sci Eng C Mater Biol Appl., Apr. 30; 29(3): 553-668.*

(Continued)

*Primary Examiner* — Allison Fitzsimmons
(74) *Attorney, Agent, or Firm* — Oblon, McClelland, Maier & Neustadt, L.L.P.

(57) ABSTRACT

The present invention relates to a filter material including a sheet-like laminate which includes an ultrafine fiber aggregate layer formed of an aggregate of ultrafine fibers produced by an electrospinning method having an average fiber diameter of not less than 10 nm and not more than 1000 nm, and a base material formed of a nonwoven fabric or a woven fabric constituted from fibers having an average fiber diameter of 1 μm or more, said filter material satisfying all of a plurality of specific requirements, having a capability of collecting or separating μm-order microfine particles with a high accuracy and exhibiting a less pressure loss and a long filtering life, as well as a filter cartridge using the filter material.

11 Claims, 1 Drawing Sheet

(51) Int. Cl.
 *B32B 27/02* (2006.01)
 *B32B 27/34* (2006.01)
 *B32B 27/36* (2006.01)
 *D01D 5/00* (2006.01)
 *D04H 1/728* (2012.01)
 *D04H 3/009* (2012.01)
 *D04H 3/011* (2012.01)
 *D04H 1/4374* (2012.01)

(52) U.S. Cl.
 CPC ... *B01D 2239/025* (2013.01); *B01D 2239/065* (2013.01); *B01D 2239/0613* (2013.01); *B01D 2239/0631* (2013.01); *B01D 2239/1216* (2013.01); *B01D 2239/1233* (2013.01)

(56) References Cited

FOREIGN PATENT DOCUMENTS

| | | |
|---|---|---|
| GB | 2 404 347 A | 2/2005 |
| JP | 2002 191918 | 7/2002 |
| JP | 2005 159283 | 6/2005 |
| JP | 2005 218909 | 8/2005 |
| JP | 2006 336173 | 12/2006 |
| JP | 2006336173 A * | 12/2006 |
| JP | 2008 221073 | 9/2008 |
| JP | 2008 246381 | 10/2008 |
| JP | 2008 308810 | 12/2008 |
| KR | 10-2006-0048009 A | 5/2006 |
| KR | 10-0714219 B1 | 5/2007 |

OTHER PUBLICATIONS

Chapter 17. Composites (2005)., PDF.*
JP 2006336173A Machine Translation.*
International Search Report issued Mar. 16, 2010 in PCT/JP09/071025 filed Dec. 17, 2009.
Extended European Search Report issued Jan. 16, 2014, in European Patent Application No. 09834761.0.
U.S. Appl. No. 14/007,830, filed Sep. 26, 2013, Hosoya, et al.
Office Action issued Nov. 11, 2015, in Korean Patent Application No. 10-2011-7014577.

* cited by examiner

FILTRATION MATERIAL FOR FILTERS, AND FILTER CARTRIDGE

TECHNICAL FIELD

The present invention relates to filter materials which are used for removing or separating microfine particles in the order of μm contained in gases and liquids with a high accuracy, and more particularly, to filter materials which have a less pressure loss, a long filtering life and an excellent filtering capability, and filter cartridges using the filter materials.

BACKGROUND ART

Hitherto, various studies have been made on filter materials using a nonwoven fabric (Patent Document 1). However, the conventional filter materials using a nonwoven fabric tend to have such a contradictory problem that when it is intended to increase a filtering accuracy of the filters, there occur a high pressure loss and a shortened filtering life thereof, whereas it is intended to reduce the pressure loss, the filtering accuracy is deteriorated.

More specifically, in the nonwoven fabric-based filter materials, the filtering performance may vary depending upon diameter or diameter distribution of fibers used therein. Therefore, when melt-blown (MB) fibers or spun-bonded (SB) fibers which exhibit a large variation of fineness in a fiber diameter range of 1 μm or more are used for the filter materials, it will be difficult to apply filters obtained therefrom to microfiltration or ultrafiltration in which the filters are required to have a capability of collecting fine particles having a particle size in the order of μm. In order to further increase the filtering accuracy, the filter materials must be subjected to calendering treatment, etc., to increase a fiber density thereof, which also results in occurrence of the above problems.

Also, glass fibers are capable of providing a sheet-like filter material formed of the fibers having a fiber diameter of 1 μm or less. Although the sheet-like filter material formed of the glass fibers exhibits a high collecting efficiency, there tends to occur such a problem that a binder component contained therein is eluted out depending upon use conditions thereof. Further, the filter material formed of the glass fibers tends to suffer from falling-off of the fibers therefrom.

On the other hand, there has been proposed the high-precision membrane filters having a very high filtering accuracy in which a standard deviation of pore sizes thereof is 0.1 μm or less (Patent Documents 2 and 3). However, these membrane filters have problems such as occurrence of early clogging and shortened filtering life as compared to the above nonwoven fabric-based filters.

Patent Document 1: JP 3449429
Patent Document 2: PCT Pamphlet WO 2002/064240
Patent Document 3: JP 2008-229612A

DISCLOSURE OF THE INVENTION

Problems to be Solved by the Invention

An object of the present invention is to provide a filter material which is improved in insufficiencies of both the conventional filter materials using a nonwoven fabric and the conventional membrane filter materials, and has a capability of collecting or separating microfine particles in the order of μm with a high accuracy and exhibits a less pressure loss and a long filtering life, as well as a filter cartridge using the filter material.

Means for Solving the Problems

As a result of intensive and extensive researches to develop filter materials which have not only a less pressure loss and a long filtering life but also a high capability of collecting fine particles having a particle size in the order of μm, the present inventors have found that when laminating nanofibers having an average fiber diameter of 10 to 1000 nm which are obtained by an electrospinning method on a base material formed of fibers having a fiber diameter of 1 μm or more, the resulting filter material exhibits both a high collecting ability and a high liquid permeability, and provides a high-performance filter material which is unexpectable from the conventional art.

Thus, the present invention provides the following aspects.

<1> A filter material including a sheet-like laminate which includes an ultrafine fiber aggregate layer formed of an aggregate of ultrafine fibers produced by an electrospinning method having an average fiber diameter of not less than 10 nm and not more than 1000 nm, and a base material formed of a nonwoven fabric or a woven fabric constituted from fibers having an average fiber diameter of 1 μm or more on which the ultrafine fiber aggregate layer is laminated, said filter material satisfying all of the following requirements (1) to (5):

(1) a fabric weight (metsuke) of the ultrafine fiber aggregate layer is not less than 0.1 g/m$^2$ and not more than 10 g/m$^2$;

(2) the ultrafine fibers are in the form of continuous long fibers;

(3) the ultrafine fiber aggregate layer has an average pore size of not less than 0.01 μm and not more than 5 μm;

(4) the ultrafine fibers and the fibers constituting the nonwoven or woven fabric have a mass loss of 3% by mass or less as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution; and (5) the ultrafine fibers and the fibers constituting the nonwoven or woven fabric have a melting temperature of not lower than 200° C. and not higher than 450° C.

<2> The filter material as described in the above aspect <1>, wherein at least one of the ultrafine fibers and the fibers constituting the nonwoven or woven fabric is any of polyester-based fibers and polyamide-based fibers.

<3> The filter material as described in the above aspect <2>, wherein the polyamide-based fibers are produced by polycondensing a dicarboxylic acid component including an aromatic dicarboxylic acid in an amount of 60 mol % or more on the basis of a total amount of the dicarboxylic acid component, with a diamine component including an $C_6$-$C_{12}$ aliphatic alkylene diamine in an amount of 60 mol % or more on the basis of a total amount of the diamine component.

<4> A filter cartridge at least partially including the filter material as described in any one of the above aspects <1> to <3>.

<5> A process for producing the filter material as described in any one of the above aspects <1> to <3>, including:

a spinning raw material liquid preparation step of dissolving a polymer in a solvent or melting the polymer to prepare a spinning raw material liquid; and a lamination step of subjecting the spinning raw material liquid to electrospinning to laminate the ultrafine fiber aggregate layer on the base material.

Effect of the Invention

In accordance with the present invention, there is provided a filter material which is capable of collecting μm-order microfine particles with a high efficiency. When using an ultrafine fiber aggregate layer obtained by an electrospinning method which has a very uniform and fine pore size distribution, it is possible to obtain a filter material which is capable of selectively collecting or separating the μm-order microfine particles with a high accuracy.

In addition, the ultrafine fiber aggregate layer is produced by an electrospinning method using only a high voltage as a driving force therefor without positively undergoing application of pressure by air, etc., or reduced pressure by suction. Therefore, the ultrafine fiber aggregate layer maintains a high porosity and can be suitably used as a long-life filter material.

PREFERRED EMBODIMENTS FOR CARRYING OUT THE INVENTION

Figure 1:
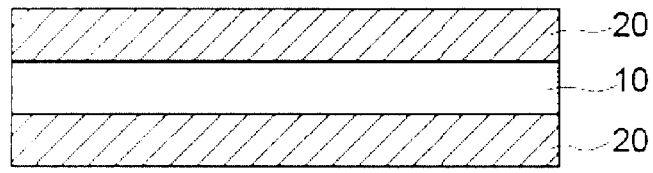
FIG. 1 is a sectional view schematically showing an example of a construction of a filter material according to the present invention.

The present invention is described in detail below by way of preferred embodiments thereof.
<Filter Material and Process for Production Thereof>

The filter material according to the present invention includes a sheet-like laminate which includes an ultrafine fiber aggregate layer formed of an aggregate of ultrafine fibers produced by an electrospinning method having an average fiber diameter of not less than 10 nm and not more than 1000 nm, and a base material formed of a nonwoven fabric or a woven fabric constituted from fibers having an average fiber diameter of 1 μm or more on which the ultrafine fiber aggregate layer is laminated.

The ultrafine fiber aggregate layer (hereinafter occasionally referred to merely as an "aggregate layer") is formed of ultrafine fibers having an average fiber diameter of not less than 10 nm and not more than 1000 nm. The fibers having an average fiber diameter of more than 1000 nm fail to have a sufficiently low fineness and a reduced fiber surface area, so that a filter obtained using the fibers tends to be considerably deteriorated in collecting efficiency. The ultrafine fibers having an average fiber diameter of less than 10 nm tend to be deteriorated in processability, so that it may be difficult to achieve stable production of the fibers.

In view of both of a good collection efficiency and a high productivity, the average fiber diameter of the ultrafine fibers is preferably not less than 40 nm and not more than 800 nm, and more preferably not less than 80 nm and not more than 500 nm.

Incidentally, the configuration of the "aggregate layer" as used herein is not particularly limited, and any layer-like configuration of a fiber aggregate may be included therein as long as it is formed of an aggregate of the ultrafine fibers. The aggregate layer is not necessarily required to have a complete layer structure. For example, the aggregate layer may also be in the form of either a nonwoven fabric or a semi-nonwoven fabric having a partially non-uniform fiber aggregation density.

The fibers constituting the base material formed of a nonwoven fabric or a woven fabric have an average fiber diameter of 1 μm or more. When the average fiber diameter of the fibers constituting the nonwoven or woven fabric of the base material is less than 1 μm, a sheet obtained therefrom tends to have a low tensile strength as described hereinlater, and the fibers tend to be deteriorated in processability when forming a filter therefrom, and further the resulting filter tends to be deteriorated in durability. A good collecting performance of the filter may be suitably ensured by the aggregate layer formed of the ultrafine fibers, whereas a good processability or a high durability of the filter may be suitably ensured by the base material. The average fiber diameter of the fibers constituting the nonwoven or woven fabric of the base material is preferably not less than 1 μm and not more than 50 μm, and more preferably not less than 1 μm and not more than 30 μm.

The fabric weight (metsuke) of the ultrafine fiber aggregate layer is not less than 0.1 g/m$^2$ and not more than 10 g/m$^2$. The ultrafine fiber aggregate layer having a fabric weight of less than 0.1 g/m$^2$ tends to hardly collect microfine particles in an efficient manner, whereas the ultrafine fiber aggregate layer having a fabric weight of more than 10 g/m$^2$ tends to be deteriorated in processability or productivity. The fabric weight of the ultrafine fiber aggregate layer is preferably not less than 0.2 g/m$^2$ and not more than 8 g/m$^2$, and more preferably not less than 0.5 g/m$^2$ and not more than 5 g/m$^2$.

It is required that the ultrafine fibers constituting the aggregate layer are in the form of continuous long fibers. The nonwoven fabric or the like which is formed of short fibers tends to suffer from falling-off of the fibers and are therefore unsuitable as a filter material. The filter material composed of the aggregate layer solely tends to have no sufficient strength owing to a small fiber diameter thereof. Therefore, the aggregate layer is used in the form of a laminate with a base material formed of a nonwoven fabric or a woven fabric constituted from fibers having an average fiber diameter of 1 μm or more.

Incidentally, the "continuous long fibers" as used herein mean fibers having a fiber length of 10 cm or longer.

In the preferred embodiments of the present invention, it is required that the ultrafine fibers and the fibers constituting the nonwoven or woven fabric have a mass loss of 3% by mass or less as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution. In addition, it is required that the ultrafine fibers and the fibers constituting the nonwoven or woven fabric have a melting temperature of not lower than 200° C. and not higher than 450° C.

When the mass loss of the ultrafine fibers and the fibers constituting the nonwoven or woven fabric as measured by the above testing method for evaluation of chemical resistance is more than 3% by mass, the resulting filter tends to be deteriorated in filtering performance.

The mass loss of the ultrafine fibers and the fibers constituting the nonwoven or woven fabric as measured by the above testing method is preferably 2% by mass or less and more preferably 1% by mass or less.

When the melting temperature of the ultrafine fibers and the fibers constituting the nonwoven or woven fabric is lower than 200° C., the resulting filter may fail to ensure a sufficient heat resistance. When the melting temperature of the ultrafine fibers and the fibers constituting the nonwoven or woven fabric is higher than 450° C., it may be difficult to produce these fibers by a spinning method such as a melt-blowing method as described below.

The melting temperature of the ultrafine fibers and the fibers constituting the nonwoven or woven fabric is preferably not lower than 220° C. and not higher than 450° C., and more preferably not lower than 250° C. and not higher than 450° C.

The filter material according to the preferred embodiments of the present invention is produced by forming the aggregate layer formed of the ultrafine fibers on a surface of the base material according to the below-mentioned production process. The aggregate layer is required to have an average pore size of not less than 0.01 μm and not more than 5 μm, and the rate of variation of pore size distribution of the aggregate layer is preferably 10% or less.

When the average pore size of the aggregate layer is more than 5 μm, the resulting filter tends to hardly collect μm-order microfine particles. When the average pore size of the aggregate layer is less than 0.01 μm, the resulting filter tends to suffer from increased pressure loss owing to rapid increase in resistance to liquid permeation, which results in considerable deterioration of filtering performance. In view of a good liquid permeability and a high collecting efficiency, the average pore size of the aggregate layer is preferably not less than 0.1 μm and not more than 3 μm, and more preferably not less than 0.1 μm and not more than 1 μm.

When the rate of variation of pore size distribution of the aggregate layer is more than 10%, it may be difficult to selectively separate the μm-order microfine particles having a particle size not less than or not more than a predetermined value. In view of selective separation of the microfine particles, the rate of variation of pore size distribution of the aggregate layer is preferably 10% or less.

The rate of variation of pore size distribution of the aggregate layer is more preferably 8% or less, and still more preferably 7% or less.

The filter material capable of satisfying the above-mentioned requirements according to the present invention is excellent in collecting performance when used as a filter. As measured by flowing ultrapure water containing monodisperse silica fine particles having a particle size of 0.5 μm or 1.0 μm in an amount of 0.2 g/cm³ through the filter material at a flow rate of 300 mL/min, the collecting efficiency of the monodisperse silica fine particles by the filter material is preferably 99% or more, and more preferably 99.9% or more.

Specific examples of a polymer as a raw constituting material of the ultrafine fibers and the fibers constituting the nonwoven or woven fabric which are used in the filter material according to the present invention include at least one polymer selected from the group consisting of aromatic polyesters such as polyethylene terephthalate, polytrimethylene terephthalate, polybutylene terephthalate and polyhexamethylene terephthalate; aliphatic polyesters and copolymers thereof such as polylactic acid, polyethylene succinate, polybutylene succinate, polybutylene succinate adipate, polyhydroxybutyrate-polyhydroxyvalerate copolymers and polycaprolactones; aliphatic polyamides and copolymers thereof such as nylon 6, nylon 66, nylon 610, nylon 10, nylon 12 and nylon 6-12; aromatic polyamides obtained by polycondensing monomer units including an aromatic diamine component such as o-phenylene diamine, m-phenylene diamine, p-phenylene diamine, 2,4-toluene diamine, 4,6-dimethyl-m-phenylene diamine, 2,4-diamino-mesitylene, 4-chloro-m-phenylene diamine and 5-nitro-m-phenylene diamine, and an aromatic dicarboxylic acid component such as phthalic acid, isophthalic acid, terephthalic acid, biphenyldicarboxylic acid, naphthalenedicarboxylic acid, and derivatives thereof such as anhydrides and halides of these acids; polystyrene-based polymers; polydiene-based polymers; chlorine-based polymers; polyurethane-based polymers; and fluorine-based elastomers. These polymers may be copolymerized with any suitable copolymerizable components. For example, in the above aromatic polyesters, a part of the terephthalic acid or a part of the diol may be substituted with the other dicarboxylic acid or the other diol.

Among these polymers, any of the polyesters and the polyamides (i.e., any of the polyester-based fibers and the polyamide-based fibers) are preferred because they are capable of satisfying both a heat resistance and a chemical resistance. In particular, the filter material used as a liquid filter is required to have good properties such as chemical resistance, durability and heat resistance. Therefore, the material of such a liquid filter may be appropriately selected from the above polymers according to the objects and applications thereof.

The above polyesters are preferably in the form of a wholly aromatic polyester having a relatively high melting temperature, and especially preferably a thermotropic liquid crystal-forming wholly aromatic polyester. The thermotropic liquid crystal-forming wholly aromatic polyester contains repeated structural units derived from aromatic diols, aromatic dicarboxylic acids, aromatic hydroxycarboxylic acids, etc. More specifically, the thermotropic liquid crystal-forming wholly aromatic polyester is preferably the polymer containing combination of repeated structural units represented by the following structural formulae (1) to (12):

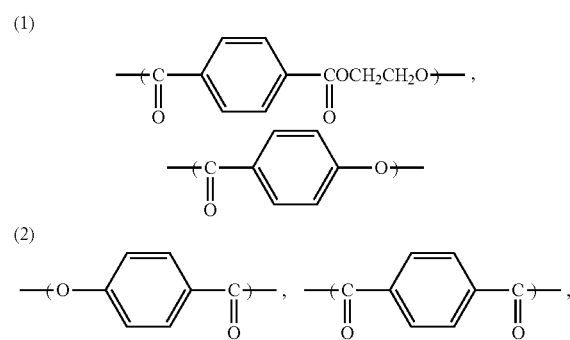

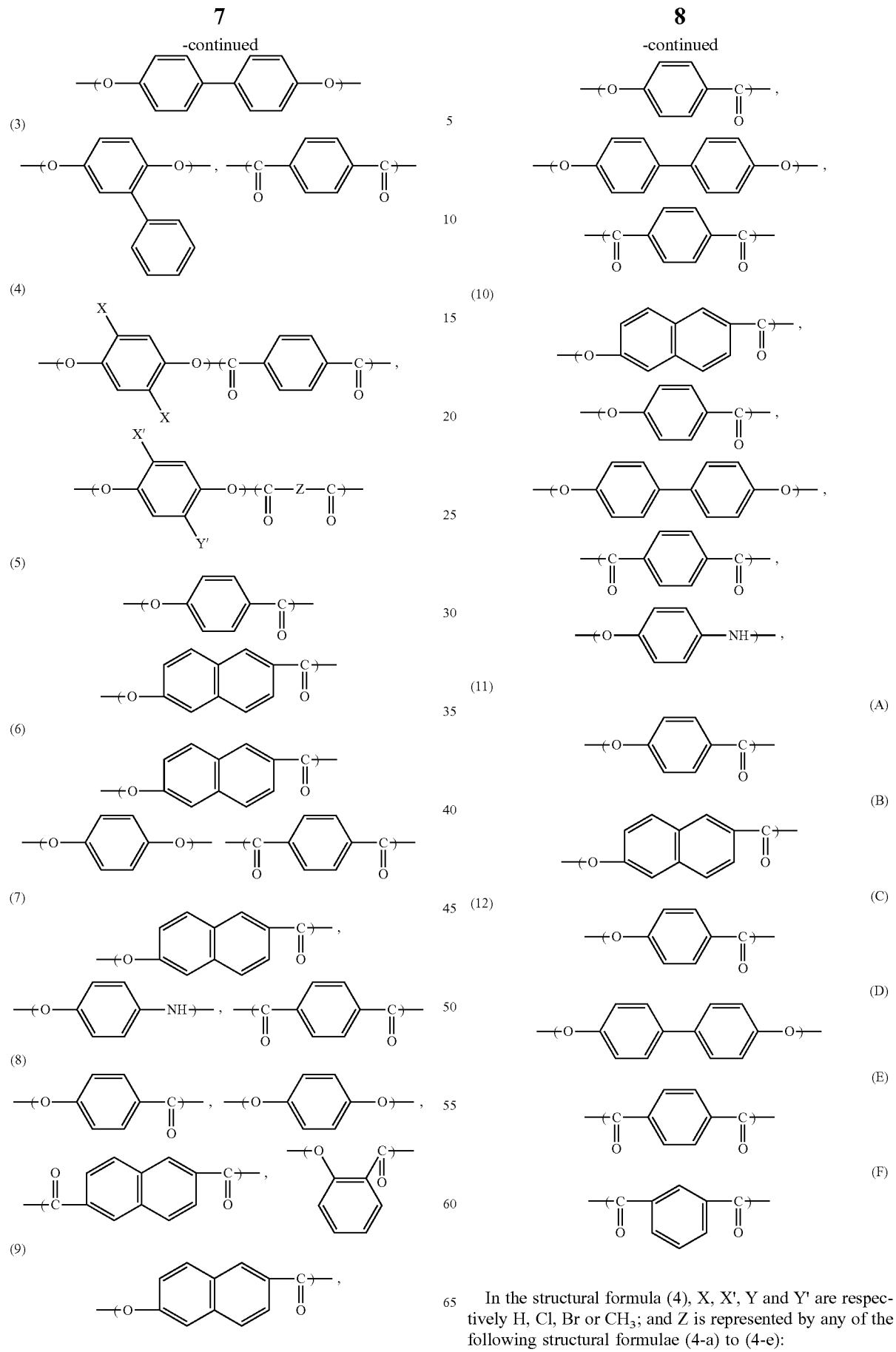
In the structural formula (4), X, X', Y and Y' are respectively H, Cl, Br or CH₃; and Z is represented by any of the following structural formulae (4-a) to (4-e):

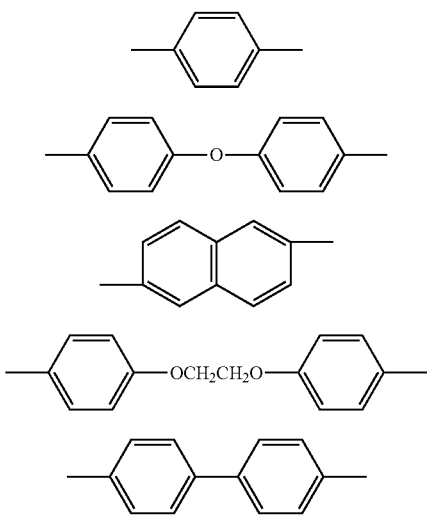

(4-a)
(4-b)
(4-c)
(4-d)
(4-e)

The thermotropic liquid crystal-forming polyester preferably has a melting temperature Tm of 260 to 360° C. and more preferably 270 to 320° C. in view of a good spinnability, etc. Among these polyesters, especially preferred are thermotropic liquid crystal-forming polyesters containing moieties constituted of structural units (A) and (B) represented by the structural formula (11) in an amount of 60 mol % or more, and most preferred are those aromatic polyesters containing the component (B) in an amount of 5 to 45 mol % on the basis of a total amount of the components (A) and (B) in view of a good spinnability and good properties of fibers obtained therefrom, etc.

The respective components may further contain the other polymers or additives (such as pigments, carbon black, heat stabilizers, ultraviolet absorbers, lubricants and fluorescent brighteners) as long as they are substantially free from deterioration in tenacity thereof.

In the preferred embodiments of the present invention, among the above fibers, the polyamide-based fibers are preferably used. Among them, especially preferred are polyamide-based fibers formed of a polymer obtained by polycondensing a dicarboxylic acid component containing an aromatic dicarboxylic acid in an amount of 60 mol % or more on the basis of the dicarboxylic acid component, with a diamine component containing a $C_6$-$C_{12}$ aliphatic alkylene diamine in an amount of 60 mol % or more on the basis of the diamine component (hereinafter occasionally referred to as a "specific polyamide-based fibers"). The polymer forming the specific polyamide-based fibers exhibits not only a good heat resistance but also a good chemical resistance as compared to those of the conventional polyamides or polyesters, and therefore can be suitably used, in particular, as a material for liquid filters.

In the polymer constituting the above specific polyamide-based fibers, the aromatic dicarboxylic acid is preferably terephthalic acid in view of a good heat resistance and a good chemical resistance. The terephthalic acid may be used in combination with one or more aromatic dicarboxylic acids selected from the group consisting of isophthalic acid, 2,6-naphthalenedicarboxylic acid, 2,7-naphthalenedicarboxylic acid, 1,4-naphthalenedicarboxylic acid, 1,4-phenylenedioxydiacetic acid, diphenic acid, dibenzoic acid, 4,4'-oxydibenzoic acid, diphenylmethane-4,4'-dicarboxylic acid, diphenylsulfone-4,4'-dicarboxylic acid and 4,4'-biphenyldicarboxylic acid.

The content of the above aromatic dicarboxylic acids is preferably 60 mol % or more, and more preferably 75 mol % on the basis of the dicarboxylic acid component.

Examples of dicarboxylic acids other than the above aromatic dicarboxylic aids include aliphatic dicarboxylic acids such as malonic acid, dimethyl malonic acid, succinic acid, 3,3-diethyl succinic acid, glutaric acid, 2,2-dimethyl glutaric acid, adipic acid, 2-methyl adipic acid, trimethyl adipic acid, pimelic acid, azelaic acid, sebacic acid and suberic acid; and alicyclic dicarboxylic acids such as 1,3-cyclopentanedicarboxylic acid and 1,4-cyclohexanedicarboxylic acid. These acids may be used alone or in combination of any two or more thereof.

Among these dicarboxylic acids, in view of a good heat resistance and a good chemical resistance, the dicarboxylic acid component preferably contains the above aromatic dicarboxylic acids in an amount of 100%, i.e., is composed of the above aromatic dicarboxylic acids solely. In addition, the dicarboxylic acid component may also contain a polyvalent carboxylic (polycarboxylic) acid such as trimellitic acid, trimesic acid and pyromellitic acid in such an amount that the resulting polymer can be readily formed into fibers.

The diamine component preferably contains the $C_6$-$C_{12}$ aliphatic alkylene diamine in an amount of 60 mol % or more. Examples of the aliphatic alkylene diamine include linear or branched aliphatic diamines such as 1,6-hexanediamine, 1,8-octanediamine, 1,9-nonanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine and 5-methyl-1,9-nonanediamine.

Among these diamines, in view of a good chemical resistance, 1,9-nonanediamine, and combination of 1,9-nonanediamine and 2-methyl-1,8-octanediamine are preferably used.

The content of the above aliphatic alkylene diamine is preferably 75 mol % or more, and more preferably 90 mol % or more on the basis of the diamine component in view of a good chemical resistance.

In the polyamide and the polyester constituting the polyamide-based fibers and the polyester-based fibers, respectively, 10% or more, preferably 40% or more, and more preferably 70% or more of end groups of a molecular chain thereof are preferably capped with an end capping agent. The end-capped molecular chain of the polymers allows the resulting fibers to exhibit excellent heat resistance and chemical resistance.

The end capping agent used above is not particularly limited, for example, as the end capping agent for the polyamide, there may be used any monofunctional compounds having a reactivity with an end amino group or an end carboxyl group of the polyamide. In view of a good reactivity with the end groups and a good end capping stability, preferred are monocarboxylic acids and monoamines. Further, in view of a good handling property, a good reactivity with the end groups, a good end capping stability and a low price, more preferred are monocarboxylic acids. Examples of the monocarboxylic acids include acetic acid, propionic acid, butyric acid, valeric acid, capronic acid, caprylic acid, lauric cid, tridecylic acid, myristic acid, palmitic acid, stearic acid and benzoic acid. Meanwhile, the end capping rate of the polymers may be determined from the value of integration of characteristic signals corresponding to respective end groups as measured by $^1$H-NMR.

Next, the process for producing the filter material according to the present invention is explained.

The filter material according to the present invention is produced through the step of laminating the ultrafine fiber aggregate layer on the base material (lamination step). The ultrafine fibers constituting the above aggregate layer may be produced by an electrospinning method. A melt-blowing method or a spun-bonding method tends to hardly obtain fibers having a fiber diameter of 10 to 1000 nm. In addition, the melt-blown fibers or spun-bonded fibers tend to have a large standard deviation of pore size distribution. Therefore, it may be very difficult to obtain fibers having a standard deviation of pore size distribution of 0.1 or less by the melt-blowing method or the spun-bonding method. The nonwoven fabric produced from glass fibers by a papermaking method also tends to hardly provide a uniform web exhibiting a standard deviation of pore size distribution of 0.1 or less.

In consequence, prior to the above lamination step, it is required to prepare a solution or a melt of the polymer (spinning raw material liquid) used for the electrospinning (spinning raw material liquid preparation step).

—Spinning Raw Material Liquid Preparation Step—

In this step, the spinning raw material liquid for the ultrafine fibers which is to be subjected to the electrospinning is prepared. As the spinning raw material liquid, there may be used either a solution prepared by dissolving the polymer in a solvent or a melt prepared by melting the polymer.

As the solvent for preparing the solution, water, organic solvents and the like may be used without any particular problems. The solution prepared by uniformly dissolving the polymer in the solvent without formation of granular gels may be suitably used as the spinning raw material liquid. The melt of the polymer may be prepared by heating and melting the polymer in an extruder, and then may be used as the spinning raw material liquid.

—Lamination Step—

Next, the above spinning raw material liquid (solution or melt) is subjected to electrospinning to laminate fibers made of the polymer on the base material formed of a nonwoven fabric or a woven fabric. The electrospinning method is not particularly limited. For example, there may be used the method in which a high voltage is applied to a conductive member to which the spinning raw material liquid can be supplied, to deposit the ultrafine fibers on a side of a counter electrode electrically connected to a ground. In this method, the spinning raw material liquid discharged from a raw material liquid supply section is charged and divided into droplets, and then a fiber is continuously drawn from a point of each droplet in the electric field so that a large number of separate fibers are diffused around. The spinning raw material liquid having even a polymer concentration as low as 10% by mass or less is likely to undergo removal of the solvent therefrom by drying upon stages of forming and thinning the fibers. As a result, the resulting fibers are deposited on a belt- or sheet-like base material disposed at a position spaced by from several centimeters to several tens of centimeters from the raw material liquid supply section. The semi-dried fibers are finely glued upon the deposition on the base material to thereby prevent movement between the fibers, and then fresh microfine fibers are sequentially deposited thereon to thereby obtain a dense sheet-like laminate.

Figure 3:
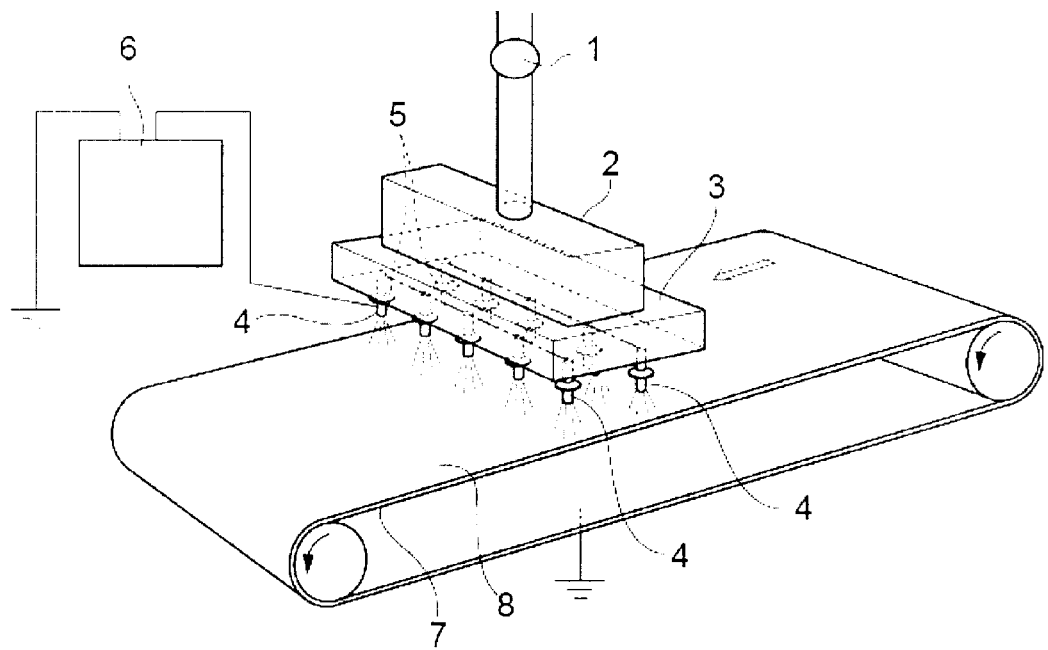
FIG. 3 is a schematic diagram showing an example of an apparatus used for producing an ultrafine fiber aggregate layer in the filter material according to the present invention.

In the following, the preferred embodiments of the present invention are explained by referring to the accompanying drawings. FIG. 3 schematically shows an example of an electrospinning apparatus. In FIG. 3, the spinning raw material liquid is metered and delivered from a constant volume pump 1, and distributed through a distribution flow control block 2 so as to render a pressure and an amount of the liquid fed therethrough uniform, and then supplied to a spinneret base 3. The spinneret base 3 is provided with hollow needle-shaped spinnerets 4 projected from each of holes formed in the spinneret base 3. The respective spinnerets 4 are mounted to the spinneret base 3 through an electrically insulating portion 5 to prevent leakage of an electric current applied thereto over a whole portion of the spinneret base 3. The respective spinnerets 4 made of a conductive material and projected from the spinneret base 3 are disposed in plural rows in the vertically downward direction perpendicular to the direction of movement of a sheet take-off apparatus 7 constructed from a endless belt. One of output terminals of a D.C. high-voltage generation power source is connected to one of the spinnerets 4 projected from the spinneret base 3, and the respective projected spinnerets 4 are electrically connected with each other through a conductive wire to thereby enable application of an electric current thereto. The endless belt of the sheet take-off apparatus 7 is fitted with a conductive member 8 electrically connected to a ground to neutralize an electric potential applied thereto.

The spinning raw material liquid supplied under pressure to the respective spinnerets 4 projected from the spinneret base 3 are charged and divided into droplets, and then a fiber is continuously drawn from a point of each droplet in an electric field so that a large number of separate fibers are diffused around. The fibers are then deposited in a semi-dried state on a base material disposed on the conductive member 8 fitted on the sheet take-off apparatus 7. Thereafter, the semi-dried fibers are glued and delivered by the sheet take-off apparatus 7 while depositing fresh microfine fibers on the base material from the projected spinnerets 4 disposed in the next row. The deposition procedure is sequentially repeated to thereby produce a dense and uniform sheet-like laminate.

Meanwhile, the fiber diameter of the ultrafine fibers produced by the above procedure may be controlled as desired by adjusting various conditions such as a concentration of the raw material liquid of the polymer, a distance between the respective spinnerets 4 and the sheet take-off apparatus 7 (distance between electrodes) and a voltage applied to the spinnerets 4.

Next, the method for producing a woven fabric or a nonwoven fabric used as the base material in the present invention is explained.

The method for producing the woven fabric as the base material is not particularly limited. Also, the method for producing the nonwoven fabric as the base material is not particularly limited. The woven fabric or the nonwoven fabric may be produced by any suitable method such as a spun-bonding method, a melt-blowing method, a spun-lacing method, a thermal bonding method, a chemical bonding method, an air-laid method and a needle-punching method. Meanwhile, the fibers constituting the base material may be optionally selected from those having an average fiber diameter of 1 μm or more according to the objects and applications thereof.

The ultrafine fibers are laminated on the base material by an electrospinning method as described above. The amount of the ultrafine fibers to be laminated on the base material is in the range of 0.1 to 10.0 g/cm$^2$ and preferably 0.2 to 8.0 g/cm$^2$ in terms of a fabric weight (metsuke) thereof. When the amount of the ultrafine fibers laminated is less than 0.1 g/cm$^2$, the resulting filter may fail to collect objective particles to be removed to a sufficient extent. On the contrary, when the amount of the ultrafine fibers laminated is more than 10.0 g/cm², the resistance to a flow of the liquid permeated through the resulting filter tends to be increased which results in shortened service life of the filter.

Then, the ultrafine fiber aggregate layer and the base material thus laminated on each other may be bonded together by a thermal bonding method such as embossing and calendering, a chemical bonding method using various adhesives, or the like to thereby form a sheet-like laminate.

Figure 2:
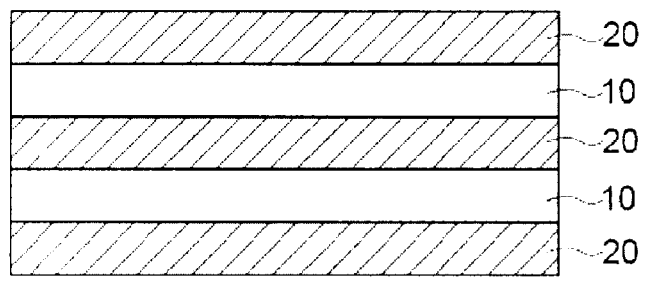
FIG. 2 is a sectional view schematically showing another example of a construction of a filter material according to the present invention.

FIG. 1 and FIG. 2 are schematic sectional views respectively showing examples of the filter materials according to the preferred embodiments of the present invention. The filter material according to the preferred embodiments of the present invention may be in the form of the above sheet-like laminate. The construction of the laminate is not particularly limited, and the laminate may have any construction as long as the base material is disposed on each of outermost surfaces of the sheet-like laminate. For example, as shown in FIG. 1, the single ultrafine fiber aggregate layer 10 may be sandwiched between the base materials 20 from opposite surfaces thereof. Also, as shown in FIG. 2, a plurality of the ultrafine fiber aggregate layers 10 and a plurality of the base materials 20 may be alternately laminated on each other such that each of the ultrafine fiber aggregate layers is sandwiched between the base materials from the opposite surfaces thereof. Thus, any suitable construction of the laminate may be used in the present invention. On the other hand, if the ultrafine fiber aggregate layer is disposed on an outermost surface of the filter material, there tends to arise such a risk that the ultrafine fiber aggregate layer suffers from physical damages from outside and therefore undergoes breakage. In addition, the resulting filter material of the present invention may be further subjected to pressing or cold pressing, if required, to adjust a thickness of the filter material according to the objects and applications thereof.

Further, the filter material of the present invention may also contain, if required, various additives such as plasticizers, antioxidants, lubricants, ultraviolet absorbers, light stabilizers, antistatic agents, flame retardants, lubricant agents, crystallization rate retarders and colorants unless the objects and effects of the present invention are adversely affected.

Furthermore, the filter material of the present invention may also be subjected to post-treatments including charging treatment using an electret, hydrophilization treatment such as plasma discharge treatment and corona discharge treatment, etc., according to the objects and applications thereof.

<Filter Cartridge>

The filter cartridge according to the present invention includes at least partially the filter material of the present invention.

More specifically, the filter material of the present invention may be used, for example, in the form of either a depth filter cartridge or a surface filter cartridge. The filter material of the present invention has a sufficient collecting efficiency even when it is constituted of a single layer. In view of a good liquid permeability and a good gas permeability, the filter material of the present invention is preferably used in the form of a surface filter cartridge obtained by processing the filter material into a pleat shape.

The filter material including the sheet-like laminate according to the preferred embodiments of the present invention exhibits a high capability of collecting fine dusts. In addition, the ultrafine fiber aggregate layer is produced using only a high voltage as a driving force without need of positively undergoing application of pressure by air, etc., or reduced pressure by suction, so that the resulting filter can maintain a high porosity and can provide a sheet having a good gas permeability and a good liquid permeability. Further, the filter formed of the filter material of the present invention maintains a good processability as well as a high durability (such as heat resistance and chemical resistance) and can be therefore suitably used as a filtering medium having a high service life. More specifically, the filter material of the present invention can be used in various liquid filtering applications including, for example, pharmaceutical industries, electronics industries, food industries, automobile industries, chemical industries, etc.

In particular, the filter material of the present invention is suitably used in the applications of filters, etc., in which a good heat resistance and a good chemical resistance are required. Specific examples of the applications of the filter material include filters for food and drugs which are subjected to sterilization treatment by heat or chemical agents, filters for production of semiconductors or fine chemicals which are used under acid or alkali conditions, and bag filers which are used for collecting dusts under high-temperature acid conditions in incinerators or boilers. Furthermore, the filter material of the present invention can fully withstand cleaning treatments with acids, alkalis, organic chemicals, etc., which are required for repeated use thereof.

EXAMPLES

The present invention is described in more detail by referring to the following examples. However, it should be noted that these examples are only illustrative and not intended to limit the invention thereto.

<Measuring and Evaluating Methods>

The methods for measuring the average fiber diameter, fabric weight (metsuke), average pore size and standard deviation of pore size distribution as well as the method for evaluating the filtering performance characteristics which were used in the following Examples and Comparative Examples are described below.

(Average Fiber Diameter)

The diameters of 20 fibers randomly selected from an enlarged micrograph of a section of the ultrafine fibers or the fibers constituting the nonwoven or woven fabric which was photographed at a magnification of 5000 times using a microscope (scanning electron microscope "S-510" available from Hitachi Ltd.) were measured, and an average value of the measured diameters was calculated as an average fiber diameter of the respective fibers.

(Fabric Weight (Metsuke) of Aggregate Layer)

The fabric weight of the aggregate layer was measured according to JIS L 1906 "Test methods for non-woven fabrics made of filament". Meanwhile, upon measurement of the basis weight of the aggregate layer, the mass of the base material only was first measured, and then the mass of the sheet-like laminate obtained after the electrospinning was measured to calculate a difference between the thus measured masses and determine the fabric weight therefrom.

(Average Pore Size of Aggregate Layer)

The aggregate layer as a sample obtained after the electrospinning was measured for an average pore size thereof using "colter POROMETER II" available from Colter Electronics Inc., under a WET-DRY measuring mode. The sample before the above measurement was dipped in "GALWICK" (available from Seika Corp.; surface tension: 15.7 dyne/cm), and the resulting wet sample obtained after the dipping was subjected to the measurement.

(Standard Deviation of Pore Size Distribution)

The standard deviation C of pore size distribution was calculated from the "average pore size" D, "pore size" Dn and "frequency in respective pore sizes" $Zn$ which were determined in the above measurement of the average pore size, according to the following formula.

$$C = \frac{100\sum_{n=1}^{N}(Dn-D)^2 Zn}{D\sum_{n=1}^{N} Zn}$$

(Evaluation of Filtering Performance)

Ultrapure water containing 0.2 g/m³ of monodisperse silica fine particles having a particle size of 0.5 μm or 1.0 μm was flowed through the respective filter materials at a flow rate of 300 mL/min to measure a collecting efficiency and a pressure loss thereof.

—Collecting Efficiency—

The ultrapure water containing the above silica fine particles was passed through the filter material at a flow rate of 300 mL/min to measure concentrations of the liquid before and after passing through the filter material by an absorbance method. From the thus measured concentrations, a collecting efficiency 1 of the filter material when passing the ultrapure water containing the silica fine particles having a particle size of 0.5 μm therethrough and a collecting efficiency 2 of the filter material when passing the ultrapure water containing the silica fine particles having a particle size of 1.0 μm therethrough were respectively calculated. The larger the calculated value becomes, the more excellent the collecting efficiency of the filter material is.

—Pressure Loss—

The pressure loss across the filter material was determined from the value calculated as a difference between the pressures measured before and after passing a liquid through the filter material.

Example 1

(Production of Base Material)

First, a base material was produced from a nonwoven fabric. A dicarboxylic acid component containing 100 mol % of terephthalic acid and a diamine component containing 50 mol % of 1,9-nonanediamine and 50 mol % of 2-methyl-1,8-octanediamine were subjected to polycondensation reaction to produce a polyamide (hereinafter referred to merely as "PA9T"; intrinsic viscosity: 0.8 dL/g; end capping rate: 91%; melting point: 265° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: less than 1% by mass). The thus produced PA9T was melt-spun at 300° C. to obtain binder fibers having a fineness of 2.9 dtex. The thus obtained fibers were stretched on a hot plate at 200° C. to obtain main fibers having a fineness of 0.7 dtex (average fiber diameter: 7.3 μm). Next, 70% by mass of the thus obtained main fibers were mixed with 30% by mass of the binder fibers to prepare a raw material. The raw material was formed into a sheet of paper using a Fourdrinier paper machine, and the obtained paper was dried using a Yankee dryer to obtain a wet nonwoven fabric base material having a fabric weight of 28.5 g/m² and a thickness of 0.13 mm.

(Production of Sheet-Like Laminate)

Next, the ultrafine fiber aggregate layer was produced. First, PA9T was charged into a formic acid solvent such that a concentration of PA9T in the obtained mixture was 10% by mass. The resulting mixture was allowed to stand at 25° C. to dissolve PA9T in the solvent, thereby obtaining a spinning raw material liquid. The resulting spinning raw material liquid was subjected to electrospinning using a spinning machine shown in FIG. 3. As the spinnerets 4, there were used needles each having an inner diameter of 0.9 mm. The distance between the respective spinnerets 4 and a sheet take-off apparatus 7 was set to 12 cm. Further, the above prepared wet nonwoven fabric base material was wound around the sheet take-off apparatus 7. Next, while operating the sheet take-off apparatus 7 at a conveyor speed of 0.1 m/min, the spinning raw material liquid was extruded in a predetermined feed amount from the respective spinnerets 4 to which a voltage of 20 kV was applied, whereby ultrafine fibers having a fiber diameter of 100 nm were deposited and laminated over the cylindrical nonwoven fabric base material such that the resulting ultrafine fiber layer had a basis weight of 2.0 g/m², thereby obtaining a sheet-like laminate constituted of the base material and an ultrafine fiber aggregate layer laminated on the base material.

(Production of Filter Material)

Next, the thus obtained sheet-like laminate and the above base material were subjected to calender treatment (calendering conditions: temperature: 140° C.; contact pressure: 0.1 MPa; treating speed: 5 m/min) and bonded to each other such that the ultrafine fiber aggregate layer was sandwiched between the base materials, thereby preparing a filter material 1.

The construction and properties of the thus prepared filter material 1 are shown in Table 1, and the filtering performance characteristics thereof are shown in Table 3. Meanwhile, in these Tables, "NF" represents ultrafine fibers.

Example 2

A sheet-like laminate was produced in the same manner as in Example 1 except that the ultrafine fibers were laminated in an amount of 5.0 g/m², and then the subsequent procedure was carried out in the same manner as in Example 1 except for using the thus produced sheet-like laminate, thereby preparing a filter material 2.

The construction and properties of the thus prepared filter material 2 are shown in Table 1, and the filtering performance characteristics thereof are shown in Table 3.

Reference Example

A sheet-like laminate was produced in the same manner as in Example 1 except that the concentration of the spinning raw material liquid used for producing the ultrafine fibers by electrospinning was adjusted to 25%, and then the subsequent procedure was carried out in the same manner as in Example 1 except for using the thus produced sheet-like laminate, thereby preparing a filter material 3.

The construction and properties of the thus prepared filter material 3 are shown in Table 1, and the filtering performance characteristics thereof are shown in Table 3.

Example 4

A sheet-like laminate was produced in the same manner as in Example 1 except that the concentration of the spinning raw material liquid used for producing the ultrafine fibers by electrospinning was adjusted to 8%, and then the subsequent procedure was carried out in the same manner as in Example 1 except for using the thus produced sheet-like laminate, thereby preparing a filter material 4.

The construction and properties of the thus prepared filter material 4 are shown in Table 1, and the filtering performance characteristics thereof are shown in Table 3.

Example 5

The filter material 1 obtained in Example 1 was treated in a 10% by mass NaOH aqueous solution at 70° C. for 2 h, and thereafter washed with water and then dried, thereby preparing a filter material 5.

The filtering performance characteristics of the thus prepared filter material 5 are shown in Table 3.

Example 6

The filter material 1 obtained in Example 1 was treated at 180° C. for 2 h, thereby preparing a filter material 6.

The filtering performance characteristics of the thus prepared filter material 6 are shown in Table 3.

Example 7

A sheet-like laminate was produced in the same manner as in Example 1 except that the fibers constituting the base material and the ultrafine fiber aggregate layer were formed from a polyamide obtained by polycondensing 50 mol % of 1,6-hexamethylenediamine, 25 mol % of adipic acid and 25 mol % of terephthalic acid (hereinafter referred to merely as "PA6T"; intrinsic viscosity: 0.85 dL/g; end capping rate: 90%; melting point: 310° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: less than 1% by mass), and then the subsequent procedure was carried out in the same manner as in Example 1 except for using the thus produced sheet-like laminate, thereby preparing a filter material 7.

The construction and properties of the thus prepared filter material 7 are shown in Table 1, and the filtering performance characteristics thereof are shown in Table 3.

Example 8

The filter material 7 obtained in Example 7 was treated in a 10% by mass NaOH aqueous solution at 70° C. for 2 h, and thereafter washed with water and then dried, thereby preparing a filter material 8.

The filtering performance characteristics of the thus prepared filter material 8 are shown in Table 3.

Example 9

The filter material 7 obtained in Example 7 was treated at 180° C. for 2 h, thereby preparing a filter material 9.

The filtering performance characteristics of the thus prepared filter material 9 are shown in Table 3.

Example 10

A sheet-like laminate was produced in the same manner as in Example 1 except that the fibers constituting the base material and the ultrafine fiber aggregate layer were formed from a polyamide obtained by polycondensing 50 mol % of 1,6-hexamethylenediamine, 25 mol % of isophthalic acid and 25 mol % of terephthalic acid (hereinafter referred to merely as "PA6-IT"; intrinsic viscosity: 0.90 dL/g; end capping rate: 92%; melting point: 320° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: less than 1% by mass), and then the subsequent procedure was carried out in the same manner as in Example 1 except for using the thus produced sheet-like laminate, thereby preparing a filter material 10.

The construction and properties of the thus prepared filter material 10 are shown in Table 1, and the filtering performance characteristics thereof are shown in Table 4.

Example 11

The filter material 10 obtained in Example 10 was treated in a 10% by mass NaOH aqueous solution at 70° C. for 2 h, and thereafter washed with water and then dried, thereby preparing a filter material 11.

The filtering performance characteristics of the thus prepared filter material 11 are shown in Table 4.

Example 12

The filter material 10 obtained in Example 10 was treated at 180° C. for 2 h, thereby preparing a filter material 12.

The filtering performance characteristics of the thus prepared filter material 12 are shown in Table 4.

Example 13

A sheet-like laminate was produced in the same manner as in Example 1 except that the fibers constituting the base material and the ultrafine fiber aggregate layer were formed from a polyamide obtained by polycondensing 25 mol % of 1,6-hexamethylenediamine, 25 mol % of methyl pentadiamine and 50 mol % of terephthalic acid (hereinafter referred to merely as "PA5-MT"; intrinsic viscosity: 0.94 dL/g; end capping rate: 93%; melting point: 305° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: less than 1% by mass), and then the subsequent procedure was carried out in the same manner as in Example 1 except for using the thus produced sheet-like laminate, thereby preparing a filter material 13.

The construction and properties of the thus prepared filter material 13 are shown in Table 1, and the filtering performance characteristics thereof are shown in Table 4.

Example 14

The filter material 13 obtained in Example 13 was treated in a 10% by mass NaOH aqueous solution at 70° C. for 2 h, and thereafter washed with water and then dried, thereby preparing a filter material 14.

The filtering performance characteristics of the thus prepared filter material 14 are shown in Table 4.

Example 15

The filter material 13 obtained in Example 13 was treated at 180° C. for 2 h, thereby preparing a filter material 15.

The filtering performance characteristics of the thus prepared filter material 15 are shown in Table 4.

Comparative Example 1

A filter ("TCP-LX" (product name) available from Advantec Inc.) constituted from a melt-blown (MB) nonwoven fabric produced from a polypropylene (PP) fiber (melting point: 160° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: less than 1% by mass) was prepared, and subjected to measurements for an average pore size, etc., thereof.

The properties of the above filter are shown in Table 2, and the filtering performance characteristics thereof are shown in Table 5. Meanwhile, although the measured values of the average pore size, standard deviation, etc., were those of a collection layer of the filter, these values are shown in the column of aggregate layer in the table.

Comparative Example 2

A membrane filter ("T050A" (product name) available from Advantec Inc.) produced from polytetrafluoroethylene (PTFE; melting point: 327° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: less than 1% by mass) was prepared, and subjected to measurements for an average pore size, etc., thereof.

The properties of the above filter are shown in Table 2, and the filtering performance characteristics thereof are shown in Table 5. Meanwhile, although the measured values of the average pore size, standard deviation, etc., were those of a collection layer of the filter, these values are shown in the column of aggregate layer in the table.

Comparative Example 3

A sheet-like laminate was produced in the same manner as in Example 1 except that the ultrafine fibers were laminated in an amount of 12 g/m$^2$, and then the subsequent procedure was carried out in the same manner as in Example 1 except for using the thus produced sheet-like laminate, thereby preparing a filter material 16.

The construction and properties of the thus prepared filter material 16 are shown in Table 2, and the filtering performance characteristics thereof are shown in Table 5.

Comparative Example 4

A sheet-like laminate was produced in the same manner as in Example 1 except that the ultrafine fibers were laminated in an amount of 0.05 g/m$^2$, and then the subsequent procedure was carried out in the same manner as in Example 1 except for using the thus produced sheet-like laminate, thereby preparing a filter material 17.

The construction and properties of the thus prepared filter material 17 are shown in Table 2, and the filtering performance characteristics thereof are shown in Table 5.

Comparative Example 5

A sheet-like laminate was produced in the same manner as in Example 1 except that the filter diameter of the fibers constituting the base material was adjusted to 0.5 μm, and then the subsequent procedure was carried out in the same manner as in Example 1 except for using the thus produced sheet-like laminate, thereby preparing a filter material 18.

The construction and properties of the thus prepared filter material 18 are shown in Table 2, and the filtering performance characteristics thereof are shown in Table 5.

Comparative Example 6

A sheet-like laminate was produced in the same manner as in Example 1 except that a 10% by mass solution prepared by dissolving polyacrylonitrile having a number-average molecular weight of 150,000 (PAN; melting point: 140° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: 8% by mass) in dimethyl formamide was used as the spinning raw material liquid for producing the ultrafine fibers by electrospinning, and then the subsequent procedure was carried out in the same manner as in Example 1 except for using the thus produced sheet-like laminate, thereby preparing a filter material 19.

The construction and properties of the thus prepared filter material 19 are shown in Table 2, and the filtering performance characteristics thereof are shown in Table 6.

Comparative Example 7

The filter material 19 obtained in Comparative Example 6 was treated in a 10% by mass NaOH aqueous solution at 70° C. for 2 h, and thereafter washed with water and then dried, thereby preparing a filter material 20.

The filtering performance characteristics of the thus prepared filter material 20 are shown in Table 6.

Comparative Example 8

The filter material 19 obtained in Comparative Example 6 was treated at 180° C. for 2 h, thereby preparing a filter material 21.

The filtering performance characteristics of the thus prepared filter material 21 are shown in Table 6.

Comparative Example 9

A sheet-like laminate was produced in the same manner as in Example 1 except that a 10% by mass solution prepared by dissolving nylon 6 having a number-average molecular weight of 200,000 (PA6; melting point: 225° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: 5% by mass) in formic acid was used as the spinning raw material liquid for producing the ultrafine fibers by electrospinning, and then the subsequent procedure was carried out in the same manner as in Example 1 except for using the thus produced sheet-like laminate, thereby preparing a filter material 22.

The construction and properties of the thus prepared filter material 22 are shown in Table 2, and the filtering performance characteristics thereof are shown in Table 6.

Comparative Example 10

The filter material 22 obtained in Comparative Example 9 was treated in a 10% by mass NaOH aqueous solution at 70° C. for 2 h, and thereafter washed with water and then dried, thereby preparing a filter material 23.

The filtering performance characteristics of the thus prepared filter material 23 are shown in Table 6.

Comparative Example 11

A sheet-like laminate was produced in the same manner as in Example 1 except that a 20% by mass solution prepared by dissolving polyvinylidene fluoride having a number-average molecular weight of 250,000 (PVDF; melting point: 160° C.; mass loss as measured by a testing method for evaluation of chemical resistance of plastics according to JIS K 7114 using water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution and a 10% by mass sulfuric acid aqueous solution: less than 1% by mass) in dimethyl acetic acid was used as the spinning raw material liquid for producing the ultrafine fibers by electrospinning, and then the subsequent procedure was carried out in the same manner as in Example 1 except for using the thus produced sheet-like laminate, thereby preparing a filter material 24.

The construction and properties of the thus prepared filter material 24 are shown in Table 2, and the filtering performance characteristics thereof are shown in Table 6.

Comparative Example 12

The filter material 24 obtained in Comparative Example 11 was treated at 180° C. for 2 h, thereby preparing a filter material 25.

The filtering performance characteristics of the thus prepared filter material 25 are shown in Table 6.

TABLE 1

| | | Example 1 | Example 2 | Reference Example | Example 4 | Example 7 | Example 10 | Example 13 |
|---|---|---|---|---|---|---|---|---|
| | Construction | PA9TNF/ PA9T nonwoven fabric | PA9TNF/ PA9T nonwoven fabric | PA9TNF/ PA9T nonwoven fabric | PA9TNF/ PA9T nonwoven fabric | PA6TNF/ PA6T nonwoven fabric | PA6ITNF/ PA6IT nonwoven fabric | PA5MTNF/ PA5MT nonwoven fabric |
| Base material | Fabric weight (metsuke) (g/m$^2$) | 28.5 | 28.5 | 28.5 | 28.5 | 28.5 | 28.5 | 28.5 |
| | Average fiber diameter (μm) | 7.3 | 7.3 | 7.3 | 7.3 | 7.1 | 7.0 | 7.5 |
| Aggregate layer | Fabric weight (metsuke) of aggregate layer (g/m$^2$) | 2.0 | 5.0 | 2.0 | 2.0 | 2.0 | 2.0 | 2.0 |
| | Average fiber diameter (nm) | 100 | 100 | 500 | 80 | 100 | 100 | 100 |
| | Average pore size (μm) | 0.252 | 0.186 | 1.44 | 0.134 | 0.255 | 0.257 | 0.250 |
| | Rate of variation of pore size distribution | 5.6 | 5.5 | 0.2 | 6.5 | 5.7 | 5.8 | 5.5 |

TABLE 2

| | | Comparative Examples | | | | | | | |
|---|---|---|---|---|---|---|---|---|---|
| | | 1 | 2 | 3 | 4 | 5 | 6 | 9 | 11 |
| | Construction | PP nonwoven fabric | PTFE membrane | PA9TNF/ PA9T nonwoven fabric | PA9TNF/ PA9T nonwoven fabric | PA9TNF/ PA9T nonwoven fabric | PANNF/ PA9T nonwoven fabric | PA6NF/ PA9T nonwoven fabric | PVDFNF/ PA9T nonwoven fabric |

TABLE 2-continued

|  |  | Comparative Examples |  |  |  |  |  |  |  |
|---|---|---|---|---|---|---|---|---|---|
|  |  | 1 | 2 | 3 | 4 | 5 | 6 | 9 | 11 |
| Base material | Fabric weight (metsuke) (g/m²) | 125 | 34 | 28.5 | 28.5 | 28.5 | 28.5 | 28.5 | 28.5 |
|  | Average fiber diameter (μm) | — | — | 7.3 | 7.3 | 0.5 | 7.3 | 7.3 | 7.3 |
| Aggregate layer | Fabric weight (metsuke) of aggregate layer (g/m²) | — | — | 12.0 | 0.05 | 2.0 | 2.0 | 2.0 | 2.0 |
|  | Average fiber diameter (nm) | 5000 | — | 100 | 100 | 100 | 200 | 100 | 250 |
|  | Average pore size (μm) | 0.970 | 0.340 | 0.120 | 0.530 | 0.255 | 0.352 | 0.249 | 0.432 |
|  | Rate of variation of pore size distribution | 50.3 | 18.3 | 5.7 | 5.6 | 5.2 | 2.3 | 5.1 | 1.8 |

TABLE 3

|  | Example 1 | Example 2 | Example 3 | Example 4 | Example 5 | Example 6 | Example 7 | Example 8 | Example 9 |
|---|---|---|---|---|---|---|---|---|---|
| Construction | PA9TNF/PA9T nonwoven fabric | PA9TNF/PA9T nonwoven fabric | PA9TNF/PA9T nonwoven fabric | PA9TNF/PA9T nonwoven fabric | PA9TNF/PA9T nonwoven fabric (heat alkali treatment) | PA9TNF/PA9T nonwoven fabric (heat treatment) | PA6TNF/PA6T nonwoven fabric | PA6TNF/PA6T nonwoven fabric (heat alkali treatment) | PA6TNF/PA6T nonwoven fabric (heat treatment) |
| Collecting efficiency 1 (%) | 99 | 99 | 15 | 99 | 99 | 99 | 99 | 99 | 99 |
| Collecting efficiency 2 (%) | 99 | 99 | 99 | 99 | 99 | 99 | 99 | 99 | 99 |
| Pressure loss (kPa) | 3 | 5 | 1 | 4 | 3 | 3 | 3 | 3 | 3 |

TABLE 4

|  | Example 10 | Example 11 | Example 12 | Example 13 | Example 14 | Example 15 |
|---|---|---|---|---|---|---|
| Construction | PA6ITNF/PA6IT nonwoven fabric | PA6ITNF/PA6IT nonwoven fabric (heat alkali treatment) | PA6ITNF/PA6IT nonwoven fabric (heat treatment) | PA5MTNF/PA5MT nonwoven fabric | PA5MTNF/PA5MT nonwoven fabric (heat alkali treatment) | PA5MTNF/PA5MT nonwoven fabric (heat treatment) |
| Collecting efficiency 1 (%) | 99 | 99 | 99 | 99 | 99 | 99 |
| Collecting efficiency 2 (%) | 99 | 99 | 99 | 99 | 99 | 99 |
| Pressure loss (kPa) | 3 | 3 | 3 | 3 | 3 | 3 |

TABLE 5

| Construction | Comparative Example 1 PPMB nonwoven fabric | Comparative Example 2 PTFE membrane | Comparative Example 3 PA9TNF/PA9T nonwoven fabric | Comparative Example 4 PA9TNF/PA9T nonwoven fabric | Comparative Example 5 PA9TNF/PA9T nonwoven fabric |
|---|---|---|---|---|---|
| Collecting efficiency 1 (%) | 72 | 99 | 99 | 62 | 99 |
| Collecting efficiency 2 (%) | 96 | 99 | 99 | 85 | 99 |
| Pressure loss (kPa) | 100 | 30 | 20 | 1 | 25 |

TABLE 6

| | Comparative Example 6 | Comparative Example 7 | Comparative Example 8 | Comparative Example 9 | Comparative Example 10 | Comparative Example 11 | Comparative Example 12 |
|---|---|---|---|---|---|---|---|
| Construction | PANNF/ PA9T nonwoven fabric | PANNF/ PA9T nonwoven fabric (heat alkali treatment) | PANNF/ PA9T nonwoven fabric (heat alkali treatment) | PA6NF/ PA9T nonwoven fabric | PA6NF/ PA9T nonwoven fabric (heat alkali treatment) | PVDFNF/ PA9T nonwoven fabric | PVDFNF/ PA9T nonwoven fabric (heat treatment) |
| Collecting efficiency 1 (%) | 99 | 10 | 50 | 99 | 75 | 99 | 65 |
| Collecting efficiency 2 (%) | 99 | 15 | 85 | 99 | 89 | 99 | 90 |
| Pressure loss (kPa) | 2 | 1 | 10 | 2 | 1 | 2 | 10 |

As apparently recognized from the results shown in Tables 4 to 6, it was confirmed that the filter materials obtained in the respective Examples all exhibited a high collecting efficiency and a reduced pressure loss.

On the other hand, it was confirmed that the commercially available filter materials and the filter materials incapable of satisfying the requirements as defined in the present invention were deteriorated in at least one of the collecting efficiency and pressure loss and therefore suffered from any problems.

INDUSTRIAL APPLICABILITY

The filter material according to the present invention maintains a high porosity and has a good gas permeability and a good liquid permeability and further provides a filter capable of maintaining a good processability and a high durability (including a heat resistance and a chemical resistance) and, therefore, can be suitably used as a filter having a long service life. More specifically, the filter material of the present invention can be used in various liquid filtering applications including, for example, pharmaceutical industries, electronics industries, food industries, automobile industries, chemical industries, etc.

The invention claimed is:

1. A filter material, comprising a sheet laminate which comprises:
   (a) an ultrafine fiber aggregate layer comprising an aggregate of at least one electrospun ultrafine fiber having an average fiber diameter of not less than 10 nm and not more than 1000 nm; and
   (b) a base material comprising a nonwoven fabric or a woven fabric comprising at least one fiber having an average fiber diameter of 1 μm or more on which the ultrafine fiber aggregate layer (a) is laminated, wherein the filter material satisfies all of (1) to (5):
   (1) a fabric weight (metsuke) of the ultrafine fiber aggregate layer is not less than 0.1 g/m² and not more than 10 g/m²;
   (2) the electrospun ultrafine fibers have a fiber length of 10 cm or longer;
   (3) the ultrafine fiber aggregate layer has an average pore size of not less than 0.1 μm and not more than 1 μm;
   (4) the electrospun ultrafine fibers and the fibers of the nonwoven or woven fabric have a mass loss of 3% by mass or less as measured by a testing method for evaluation of chemical resistance of plastics according to JIS K 7114 with water, acetone, methanol, ethanol, propanol, isopropanol, toluene, benzene, cyclohexane, cyclohexanone, tetrahydrofuran, dimethyl sulfoxide, 1,4-dioxane, pyridine, ethylene carbonate, diethyl carbonate, propylene carbonate, a 10% by mass sodium hydroxide aqueous solution, and a 10% by mass sulfuric acid aqueous solution; and
   (5) the electrospun ultrafine fibers and the fibers of the nonwoven or woven fabric have a melting temperature of not lower than 200° C. and not higher than 450° C., wherein the electrospun ultrafine fibers and the fibers of the nonwoven or woven fabric each comprise:

a polyester; or a polyamide which comprises:
   a structural unit derived from a dicarboxylic acid comprising an aromatic dicarboxylic acid in an amount of 60 mol % or more based on a total amount of the dicarboxylic acid; and
   a structural unit derived from a diamine comprising a $C_6$-$C_{12}$ aliphatic alkylene diamine in an amount of 60 mol % or more based on a total amount of the diamine, and wherein the polyester is a wholly aromatic polyester which comprises a combination of repeated structural units represented by formulae (1) to (12):

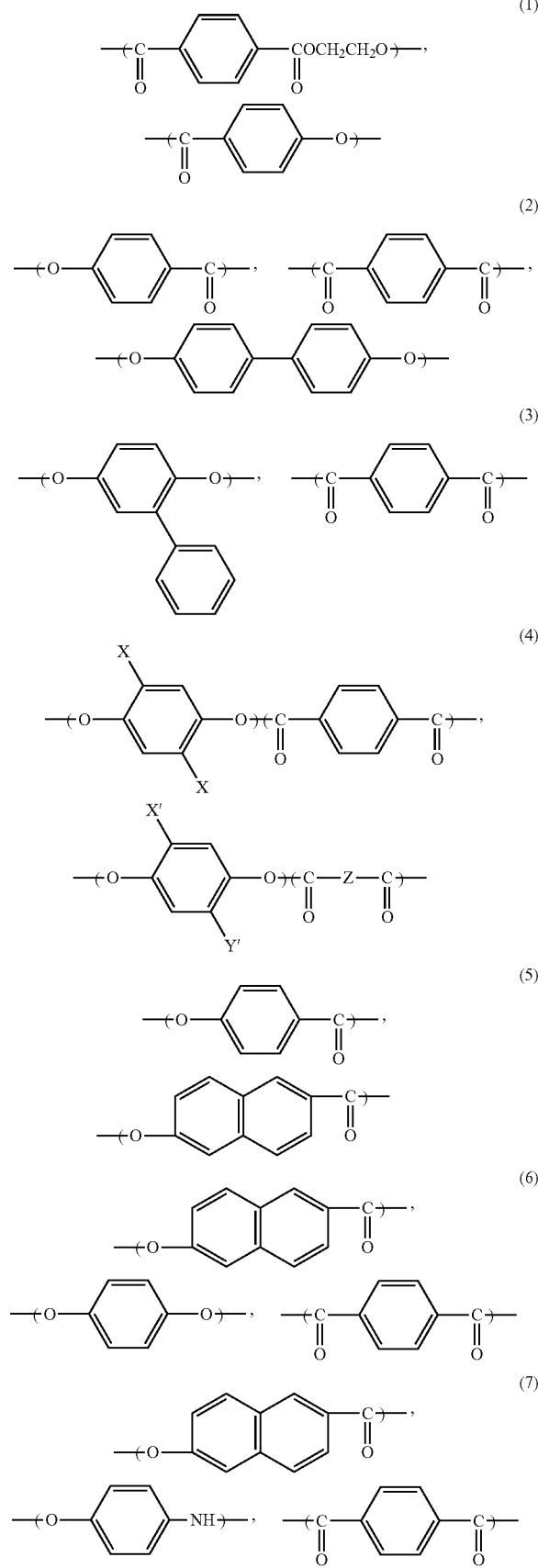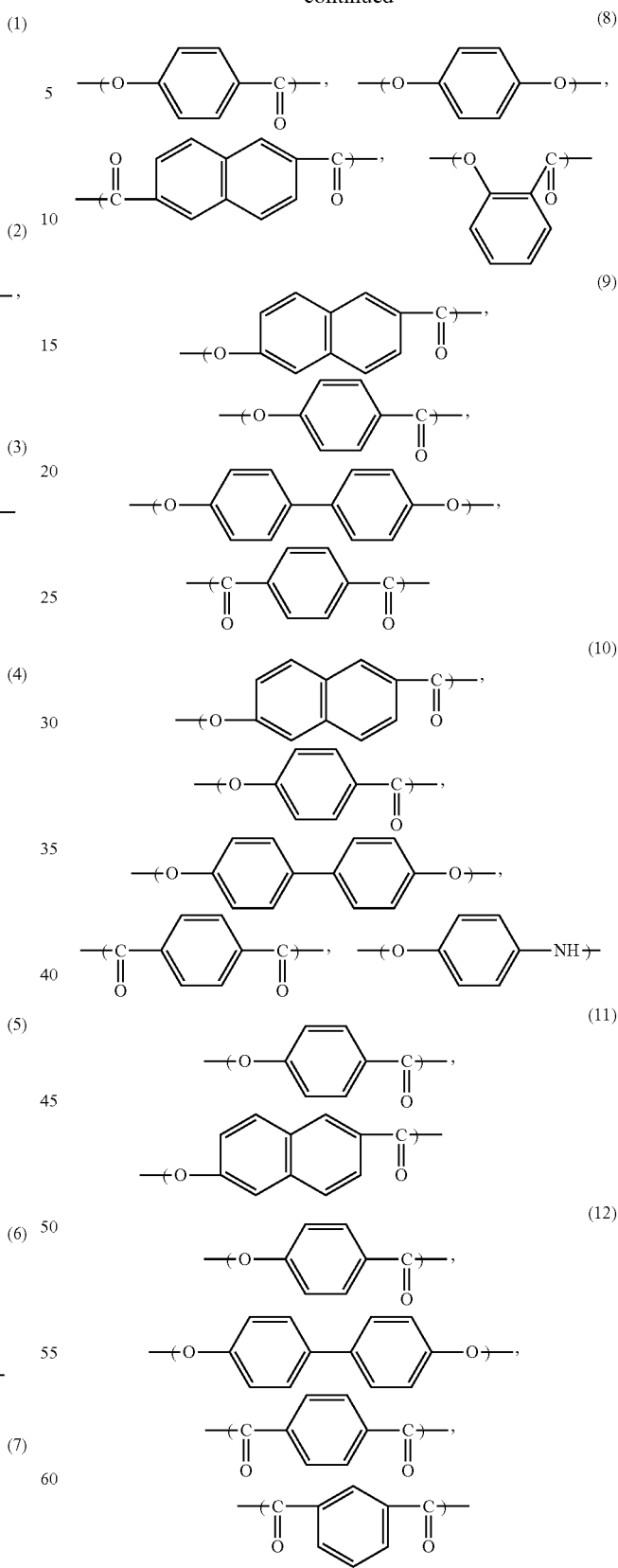
wherein, in the formula (4), X, X', Y and Y' are each independently H, Cl, Br or CH$_3$;

and Z is represented by one of formulae (4-a) to (4-e):

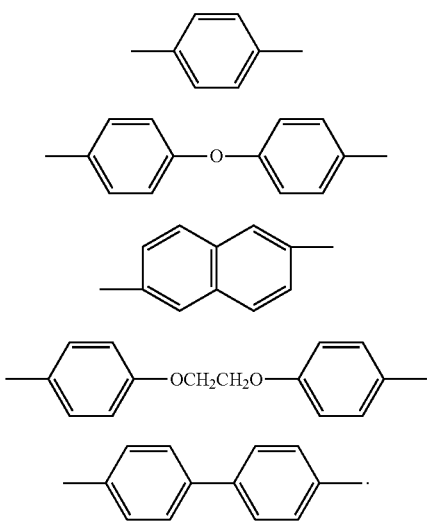

2. A filter cartridge comprising the filter material of claim 1.

3. A process for producing a filter material, comprising:
dissolving a polymer in a solvent or melting the polymer to prepare a spinning raw material liquid; and
subjecting the spinning raw material liquid to electrospinning such that an ultrafine fiber aggregate layer comprising an aggregate of at least one electrospun ultrafine fiber is laminated to a base material and that the filter material of claim 1 is formed.

4. The filter material of claim 1, wherein at least one selected from a group consisting of the at least one electrospun ultrafine fiber and the at least one fiber of the nonwoven or woven fabric is a polyester-comprising fiber.

5. The filter material of claim 1, wherein at least one selected from a group consisting of the at least one electrospun ultrafine fiber and the at least one fiber of the nonwoven or woven fabric is a polyamide-comprising fiber.

6. The filter material of claim 1, wherein the at least one electrospun ultrafine fiber has an average fiber diameter of not less than 40 nm and not more than 800 nm.

7. The filter material of claim 1, wherein the at least one electrospun ultrafine fiber has an average fiber diameter of not less than 80 nm and not more than 1000 nm.

8. The filter material of claim 1, wherein the at least one electrospun ultrafine fiber has an average fiber diameter of not less than 80 nm and not more than 800 nm.

9. The filter material of claim 1, wherein the at least one electrospun ultrafine fiber has an average fiber diameter of not less than 80 nm and not more than 500 nm.

10. The filter material of claim 1, wherein the at least one fiber of the nonwoven fabric or woven fabric has an average fiber diameter of 1 μm or more and not more than 50 μm.

11. The filter material of claim 1, wherein the at least one electrospun ultrafine fiber comprises the polyamide.

* * * * *